(12) United States Patent
Morimatsu

(10) Patent No.: US 6,573,629 B1
(45) Date of Patent: Jun. 3, 2003

(54) THREE-PHASE MAGNETO GENERATOR

(75) Inventor: Masaki Morimatsu, Mori-machi (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 09/628,755

(22) Filed: Jul. 31, 2000

(30) Foreign Application Priority Data

Oct. 8, 1999 (JP) ............................................. 11-288449

(51) Int. Cl.[7] .................................................. H02K 3/00
(52) U.S. Cl. ...................................... 310/166; 310/180
(58) Field of Search ................................. 310/179–180, 310/166, 168, 184, 185, 198, 208; 29/596–598

(56) References Cited

U.S. PATENT DOCUMENTS

| | | | | |
|---|---|---|---|---|
| 4,719,378 A | * | 1/1988 | Katsuma et al. | 310/208 |
| 4,864,199 A | * | 9/1989 | Dixon | 318/254 |
| 5,436,518 A | * | 7/1995 | Kawai | 310/156 |
| 6,252,323 B1 | * | 6/2001 | Nishikawa et al. | 310/156 |

* cited by examiner

*Primary Examiner*—Tran Nguyen
(74) *Attorney, Agent, or Firm*—Ernest A. Beutler

(57) ABSTRACT

A three-phase magneto generator that provides a greater and more uniform output for a given driving force and at a lower temperature to provide a more compact generator. This is accomplished by having no more than two armature teeth are in registry with a single magnetic segment during the relative rotation.

10 Claims, 11 Drawing Sheets

Output waveform according to the present invention

Output waveform with the conventional arrangement

THREE-PHASE MAGNETO GENERATOR

BACKGROUND OF THE INVENTION

This invention relates to a three-phase magneto generator and more particularly to such a device that provides a greater and more uniform output for a given driving force and at a lower temperature to provide a more compact generator.

Conventional magneto generators have a rotor carrying permanent magnets that is driven by a prime mover such as an internal combustion engine to induce voltages in stator coils as the rotating magnetic fields pass the stator coils. The number of magnetic poles of the permanent magnets disposed in the rotating (circumferential) direction of the rotor is 2n where "n" is a positive integer. This is because the same number of N-poles and S-poles must be located at equal intervals in the circumferential direction. In the case of a three-phase generator, the number of teeth or armature cores P of the stator core is 3m with "m" being a positive integer.

Conventionally, n=m. That is, when the number of magnetic poles M of the rotor is arranged as 2n, the number of teeth P of the stator core is set to 3m=3n. For example, when n=6, the number of magnetic poles M is set to 12, the number of teeth or armature cores P is 18. When n=8, those numbers are defined as M=16, and P=24.

This conventional relationship is shown in FIGS. 1 and 2 that show respectively, a partial cross sectioned front view a diametrical cross section a magneto generator, with n=m =6, or M=12 and P=18. A rotor, shown generally at 21, comprises a boss portion 22 is driven for example by being secured to a crankshaft (not shown) of an internal combustion engine or other suitable prime mover. The rotor 21 further comprises a generally cup-shaped cup portion 23 secured to a flange of the boss portion 22. A plurality of annular permanent magnets 24 are suitably secured to the inside circumferential surface of the cup portion 23. The permanent magnets 24 are magnetized to have 2n poles of opposite polarities in the circumferential direction. This conventional example is arranged as n=6, and so number of magnetic poles M is 2n=12.

A stator 25 cooperates with the rotor 21. The stator 25 is comprised of a stator core formed by laminating thin steel plates having teeth or armatures 26 on which coils 27 are wound. The number of teeth 26 of the stator 25 is 18. In this case, m=6 because 3×m=18. The coils 27 have U-, V-, and W-phases. The coil of each phase is wound on every three teeth 26 in succession. In this case, the every three teeth or armature on which the coils 27 of the same phase are wound oppose the same polarity of the magnet 24 at the same electrical angle. In order to arrange that the teeth of the same phase oppose the same polarity of the magnet 24 at the same electrical angle as described, it is necessary that either n=m or at least n is an integer multiple of m.

With the conventional generator as described above, since electricity is generated in the state of that the m (six) teeth 26 wound on the coils 27 having same place are opposed to the m (six) permanent magnets in the same phase, harmonics induced at the respective m (six) teeth are superimposed in the same phase, and distortion in the output waveform is intensified. This distortion is graphically illustrated in FIG. 3. The three phase wiring diagram for the machine and voltage outputs V1 and V2 are shown in FIG. 4.

Because of this distortion the torque required for driving the rotor 21 increases for a given output to be produced. This problem has been exacerbated in recent years because the performance of permanent magnets has been significantly improved. For example, the neodymium-iron-boron magnet having a high maximum magnetic energy product has come to be known. When such a high performance magnet is used, variation in the driving torque for the rotor also increases.

With the increase in the driving torque, when the rotor is driven with an internal combustion engine, cyclic variation in the load on the engine also increases. This in particular necessitates increase the of the driving power or output of the engine. This is shown in the broken line curves of FIG. 5. In the case the generator is driven with the engine, this means that the size of the engine increases. Moreover, since the coils of respective phases are connected in series at the same electrical angle, generated voltage is increased, but the output voltage waveform is not smooth and includes many harmonics, resulting in a low generation efficiency as also shown in this figure.

This further results in problems of self-heat generation of the generator as seen in the broken line curve of FIG. 6. Thus the amount of generated electricity cannot be increased without increasing the size of the generator.

Moreover, the output voltage waveforms in respective phases are heavily disturbed and include many sharp spike-shaped waveforms with high peak voltages as seen in FIG. 3. This has necessitated a capacitor for smoothing the output voltage which, in turn, has resulted in the use of a large size and high cost capacitor. Such problems become particularly acute when the neodymium-iron-boron magnet is used.

It is therefore an object of this invention to provide a three-phase magnetic generator that makes it possible to reduce the size and power of the driving prime mover by reducing the driving torque while at the same time improving the generation efficiency by smoothing the output voltage waveform.

It is a further object of the invention to reduce the size of coils or to produce a high output by making the coils compact by reducing the amount of self-generated electricity and also to reduce the size and cost of the smoothing capacitor by reducing the peak voltage or totally eliminating the need for such capacitors.

SUMMARY OF THE INVENTION

This invention is adapted to be embodied in a generator that is comprised of relatively rotatably first and second components. The first component has affixed to it in circumferentially spaced array, a plurality of segmented cylindrical, permanent magnets. The second member has a plurality of armature teeth around which coils are wound so that an electrical current will be induced in the coil windings upon relative rotation between the two members. The configuration is such that no more than two armature teeth are in registry with a single magnetic segment during the relative rotation.

In accordance with another feature of the invention, the configuration is such that the voltages induced at the armature teeth is the same phase voltage and of the same phase around the circumference of the machine.

In accordance with a still further feature of the invention, this is achieved by having the number of magnetic poles being equal to 2n and the number of armature teeth is equal to 3m where n and m are positive integers and that 2n divided by m is not an integer.

DETAILED DESCRIPTION OF THE PREFERRED EMBODIMENTS

Figure 7:
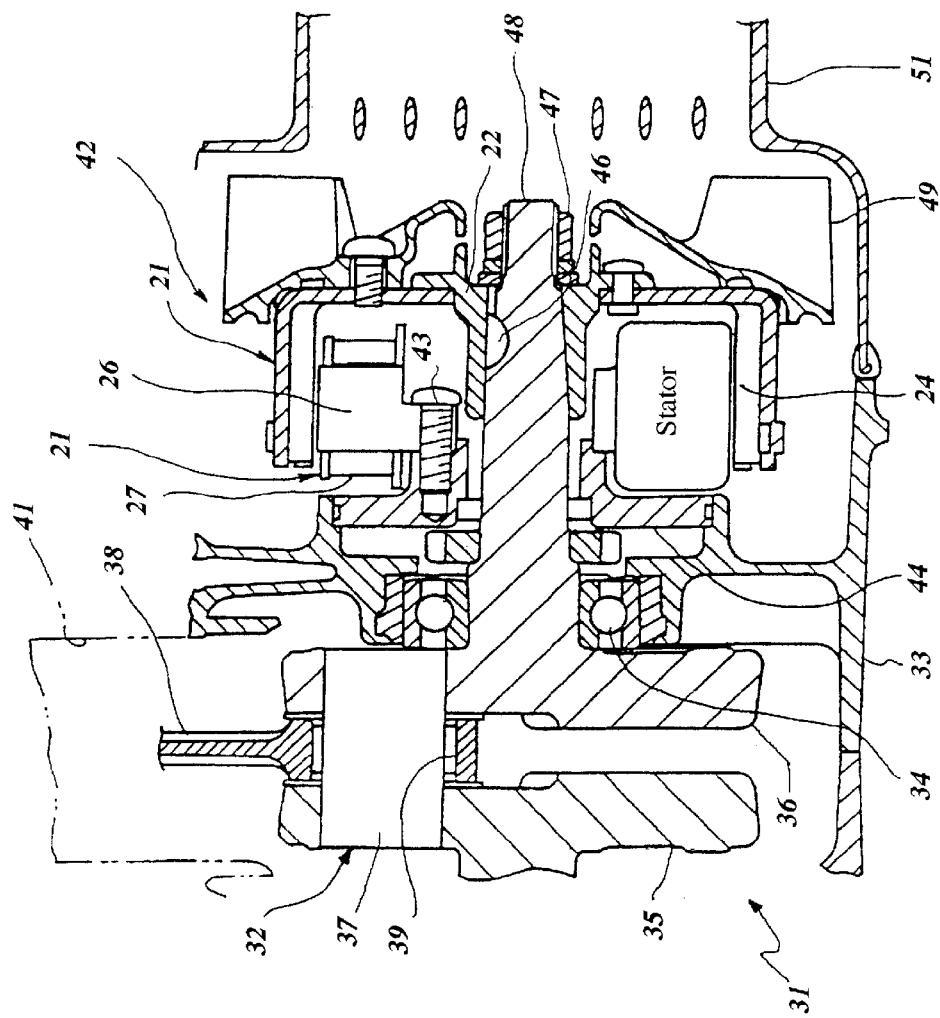
FIG. 7 is a diametric cross sectional view, in part similar to FIG. 1, and shows a generator constructed in accordance with a first embodiment in driving relation to an internal combustion engine shown in part.
Figure 8:
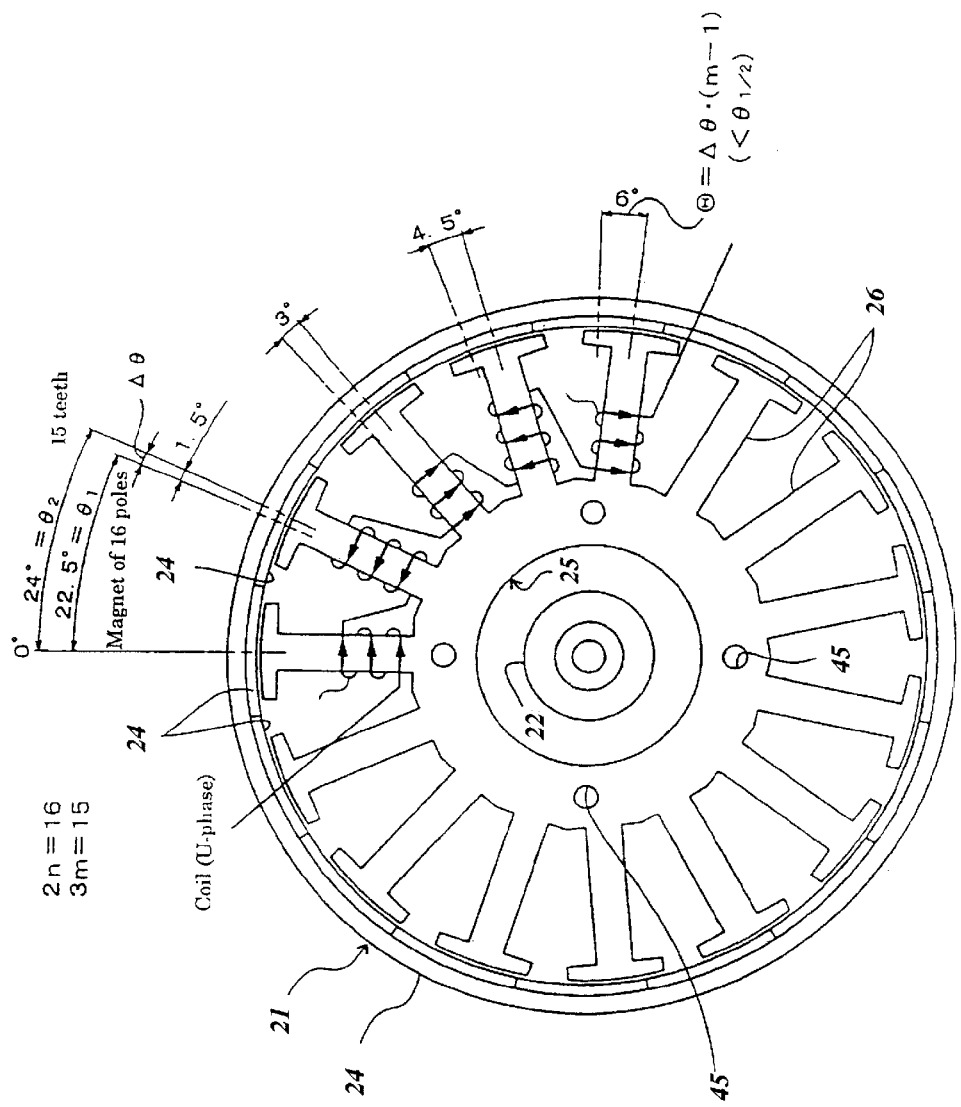
FIG. 8 is a front view of the embodiment shown in FIG. 7.

Referring first to the embodiment of FIGS. 7 and 8, the output shaft of a prime mover such as an internal combustion engine 31, namely a crankshaft 32 is supported with a right-left split crankcase 33. A bearing 34, together with another bearing (not shown), supports the crankshaft 32 for rotation within the crankcase 33. The crankshaft 32 is formed by joining paired right and left crank webs 35 and 36 together by a crank pin 37. The big end of a connecting rod 38 is supported through a needle bearing 39 on the crank pin 37. The small end of the connecting rod 38 is pivotally connected to a piston (not shown) for reciprocation within a cylinder 41 of the engine 31.

Part of the crankshaft 32 projects through a wall of the crankcase 33 to drive a three-phase magnetic generator 42 is mounted thereon and constructed in accordance with this first embodiment. The generator 42 comprises a stator 25 (using the same reference numerals as applied to the prior art construction previously described). This is done because the components are the same except for their size and number. The stator 25 is secured by bolts 43 to a stator holder 44 fixed to a front wall of the crankcase 33. That is, four bolts 43 are inserted into four bolt holes 45 (FIG. 8) bored in a stator core.

The boss portion 22 of the rotor 21 is fit over a tapered surface of the crankshaft 32 and held against rotation by a key 46. A nut 47 is threaded onto a threaded end 48 of the crankshaft 32. A fan 49 is secured to the rotor 21 and covered with a cowling 51. The fan 49 sends cooling air around the cylinder 41 for forced air cooling of the engine 31.

In this embodiment, 8 permanent magnets 24 of neodymium-iron-boron having 16 (=2n) poles are used. The stator core has 15 (3m=15) teeth or armatures 26 and associated windings 27. Therefore, n=8, and m=5. In this case, the angle between magnets 24 or the pitch angle $\theta_1$ is $2\pi/2n$ (radian)=22.5°. The angle between teeth 25 or the pitch angle $\theta_2$ is $2\pi/3m$ (radian)=24°. Coils or windings 27 of the same phase are wound on successive m (=5) teeth 26. Here, since adjacent teeth 26 are located opposite the magnets 24 of alternately different polarities, the five coils 27 are wound alternately in opposite directions, so that the polarities of voltages induced in respective coils 27 are the same each other. No more than two teeth or armatures 26 are ever associated with any one of the magnets 24.

Progressing circumferentially along five teeth 26, the fifth tooth 26 is displaced from the respective magnet 24 by a phase of $\Delta\theta x$ (m-1)=$\Delta\theta \times 4$=6°. In order that the angle 6° remains within the range of the magnet 24, it is arranged that the displacement angle is smaller than a half of the pitch angle $\theta_1$ of the magnet 24, $\Delta\theta \times 4 < \theta_1/2$. As a result, the voltage induced in the coil 27 can be increased sufficiently. Thus the smooth output waveform output shown in FIG. 9 also results.

Figure 10:
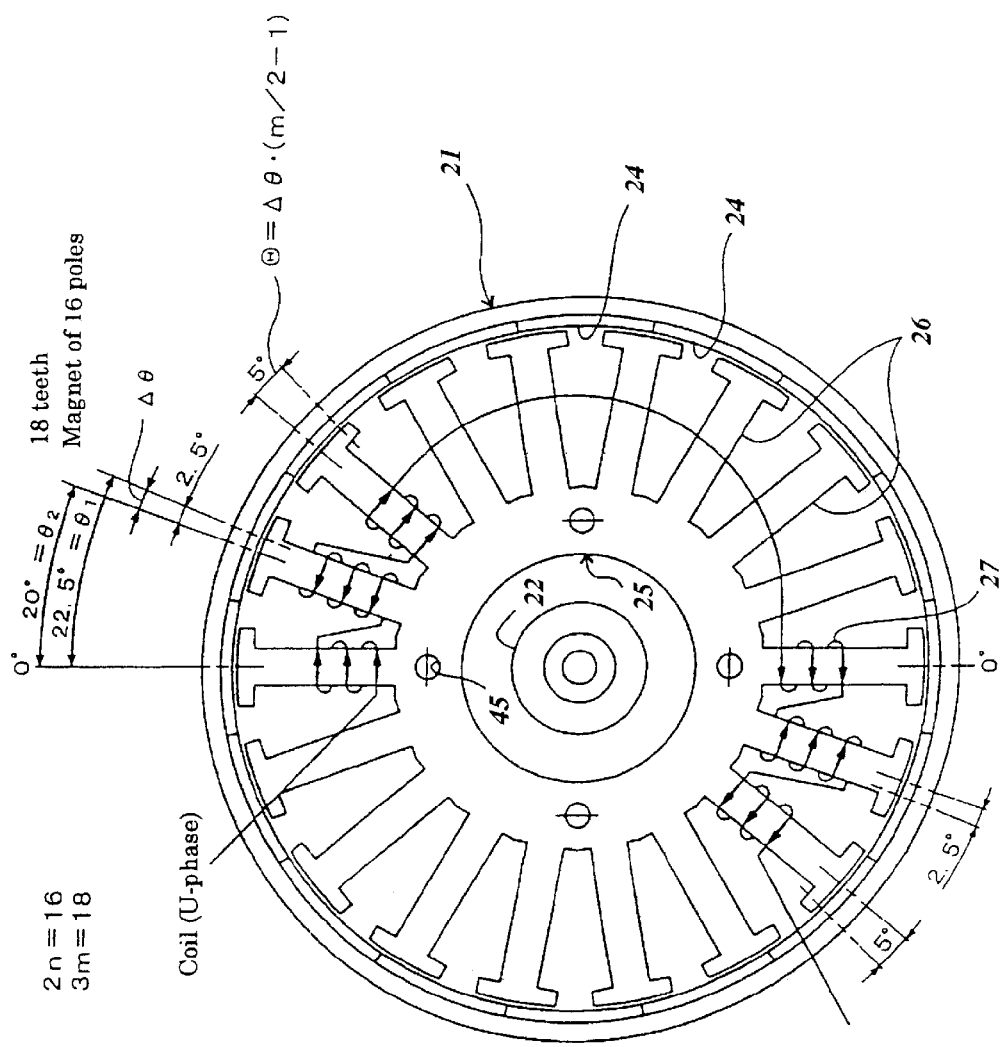
FIG. 10 is a front view, in part similar to FIG. 8 and shows a second embodiment of the invention.

FIG. 10 is a front view of another embodiment of the generator. In this figure, parts that are the same as those in the embodiment of FIGS. 7 and 8 are provided with the same reference numerals and their descriptions will not be repeated.

This embodiment employs a neodymium-iron-boron magnet 24 with 16 (=2n) poles, and 18 (=3m) teeth or armatures 26. Therefore, n=8 and m=6. In this case, the angle between magnets 24 for the pitch angle $\theta_1$ is $2\pi/2n$ (radian)=22.5°. The angle between teeth or the pitch angle $\theta_2$ is $2\pi/3m$ (radian)=20°. Since the number of teeth 26 is the multiple of two, the coils 27 of the same phase (U-phase in FIG. 10) are divided into two sets. That is, each set consists of three (=m/2) coils 27 wound on successive three teeth 26 and located symmetrically with respect to the center.

Here, since adjacent teeth 26 face the magnets 24 of different polarities, the coils 27 are wound alternately in opposite directions, so that the voltages induced in respective coils 27 do not have opposite directions from one to another. In this embodiment, the displacement angle of three (=m/2) teeth 26 relative to three magnets 24, or the phase difference $\ominus$ is $\Delta\theta x$ (m/2-1)=$\Delta\theta \cdot 2$. Therefore $\ominus = \Delta\theta \cdot 2 < \theta_1/2$.

Figure 1:
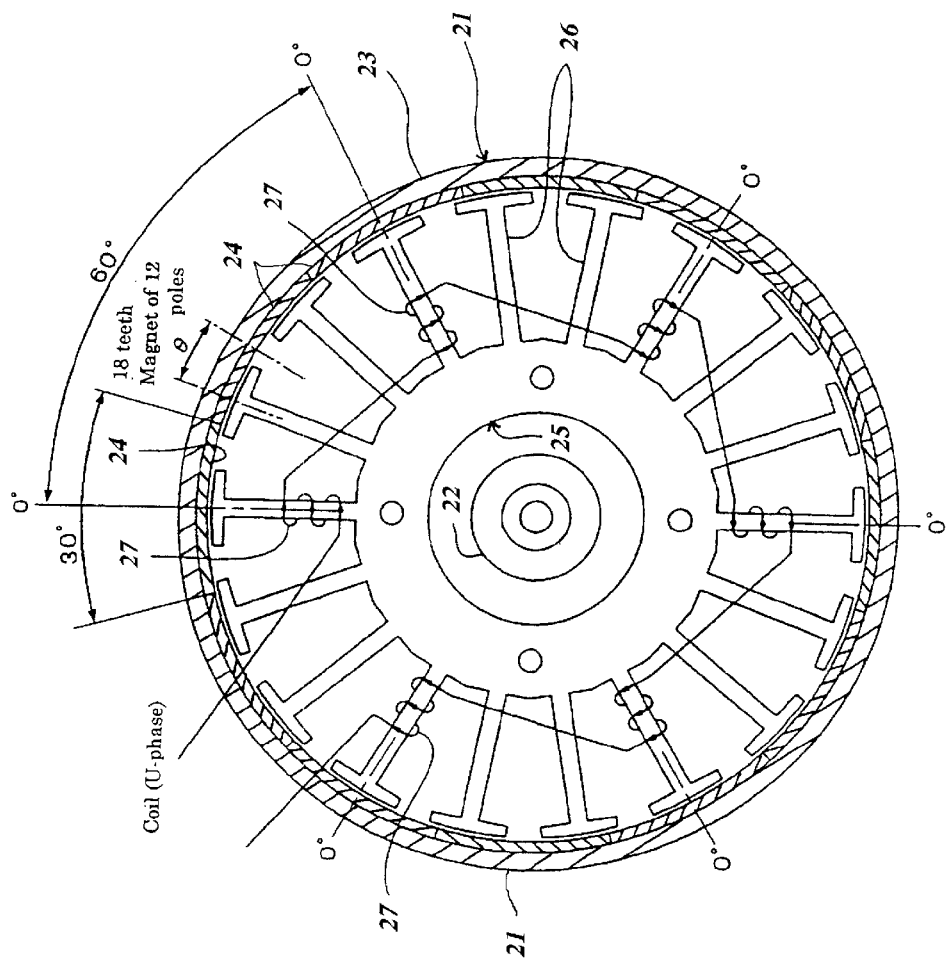
FIG. 1 is a front view of a conventional generator arrangement.
Figure 2:
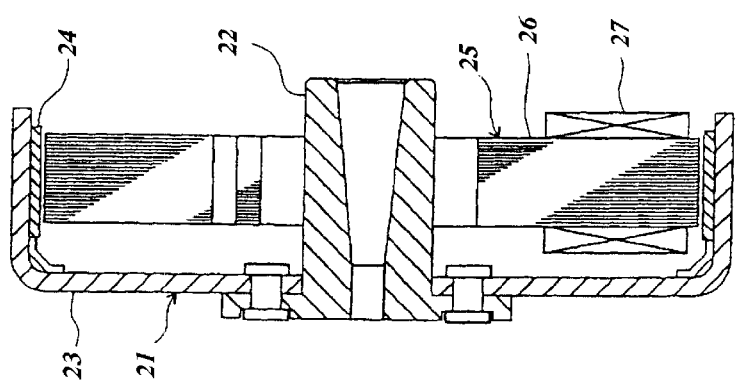
FIG. 2 is a diametric cross sectional view of the conventional generator shown in FIG. 1.
Figure 9:
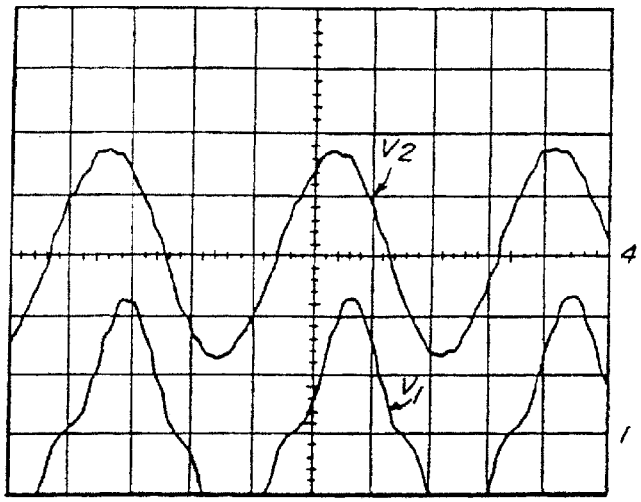
FIG. 9 is a graphical view in part similar to FIG. 3 but shows the phase voltage waveform of the embodiment of FIGS. 7 and 8.
Figure 3:
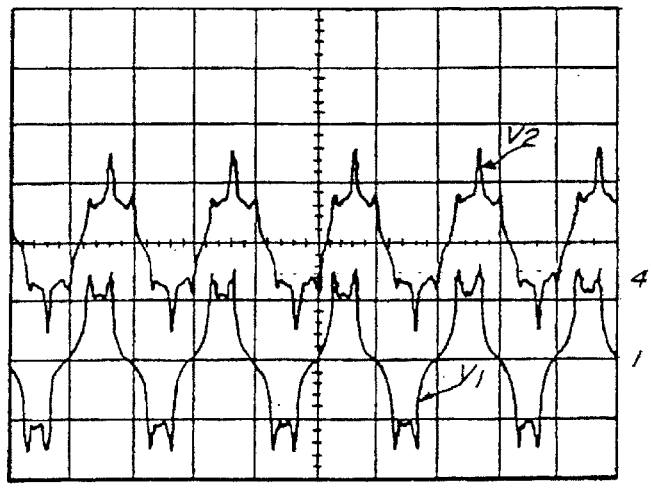
FIG. 3 shows phase voltage waveform of the conventional generator. and one constructed in accordance with a first embodiment of the invention.
Figure 4:
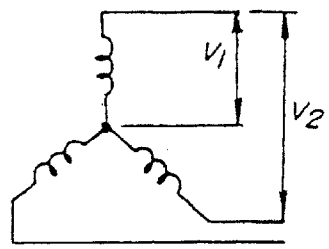
FIG. 4 is a schematic circuit diagram showing the voltage value measurement points used in FIG. 3.

As has been noted, FIGS. 9 and 3 show respectively the distortion of the output voltage waveform obtained with an embodiment of the invention in comparison with that obtained with a conventional arrangement. Here, the embodiment of the invention is the one shown in FIGS. 7 and 8 with 16 poles and 15 teeth, and the conventional arrangement is the one shown in FIGS. 1 and 2 with 12 poles and 18 teeth. FIG. 9 shows phase voltage $V_1$ and inter-phase voltage $V_2$ obtained according to the invention, and FIG. 3 shows phase voltage $V_1$ and inter-phase voltage $V_2$ obtained according to the conventional arrangement. As seen from FIG. 3, the output voltage waveforms $V_1$ and $V_2$ of the conventional arrangement include not only large distortion but also many sharp spike-shaped waveforms and many harmonic components. On the other hand, as seen from FIG.

9, the output voltage waveforms $V_1$ and $V_2$ of the invention are smooth and include less distortion and harmonic components.

Figure 11:
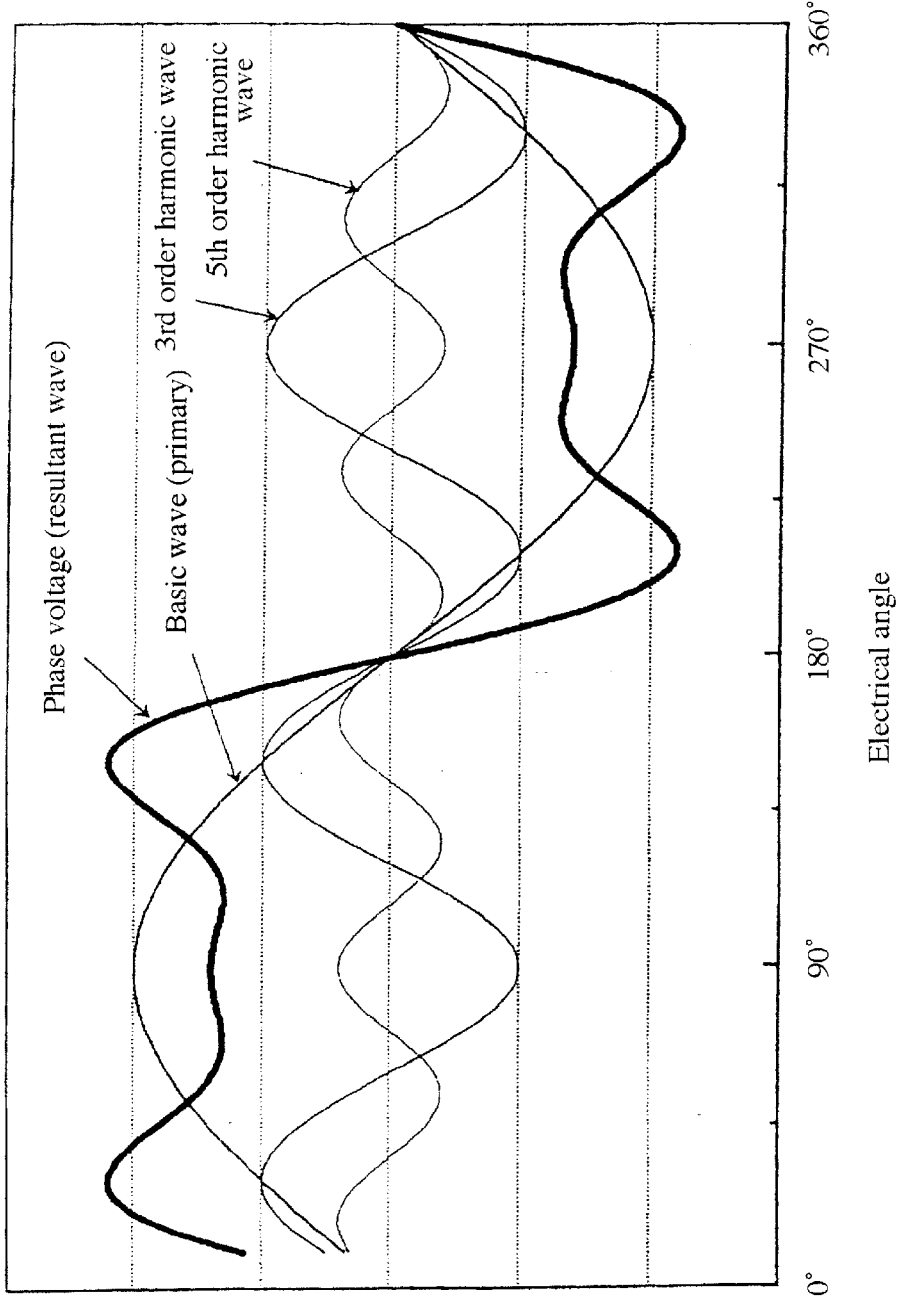
FIG. 11 is a graphical view showing the phase voltage waveform of a conventional arrangement.
Figure 12:
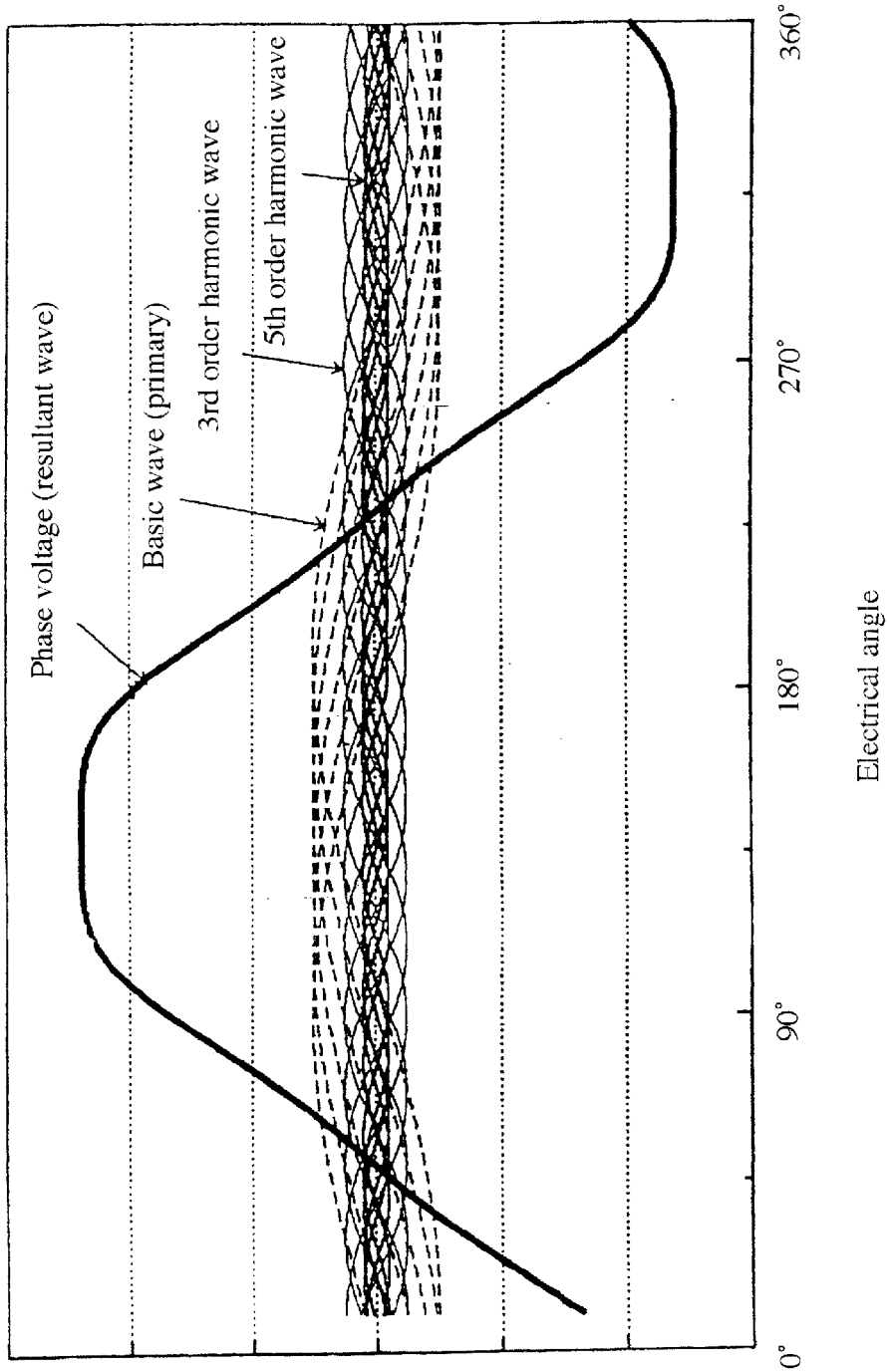
FIG. 12 is a graphical view showing the phase voltage waveform of a generator constructed in accordance with the invention.

FIGS. 11 and 12 show the phase voltage waveforms obtained by computer simulation analysis. FIG. 12 shows the result obtained with an embodiment of the invention (with 16 poles and 18 teeth) similar to that shown in FIG. 10. FIG. 11 shows the result obtained with a conventional arrangement (with 12 poles and 18 teeth). From these figures, it should be apparent that this invention can reduce distortion in the resultant waveform by reducing the amplitudes of the basic (primary) wave, third order wave, and fifth order wave.

Figure 13:
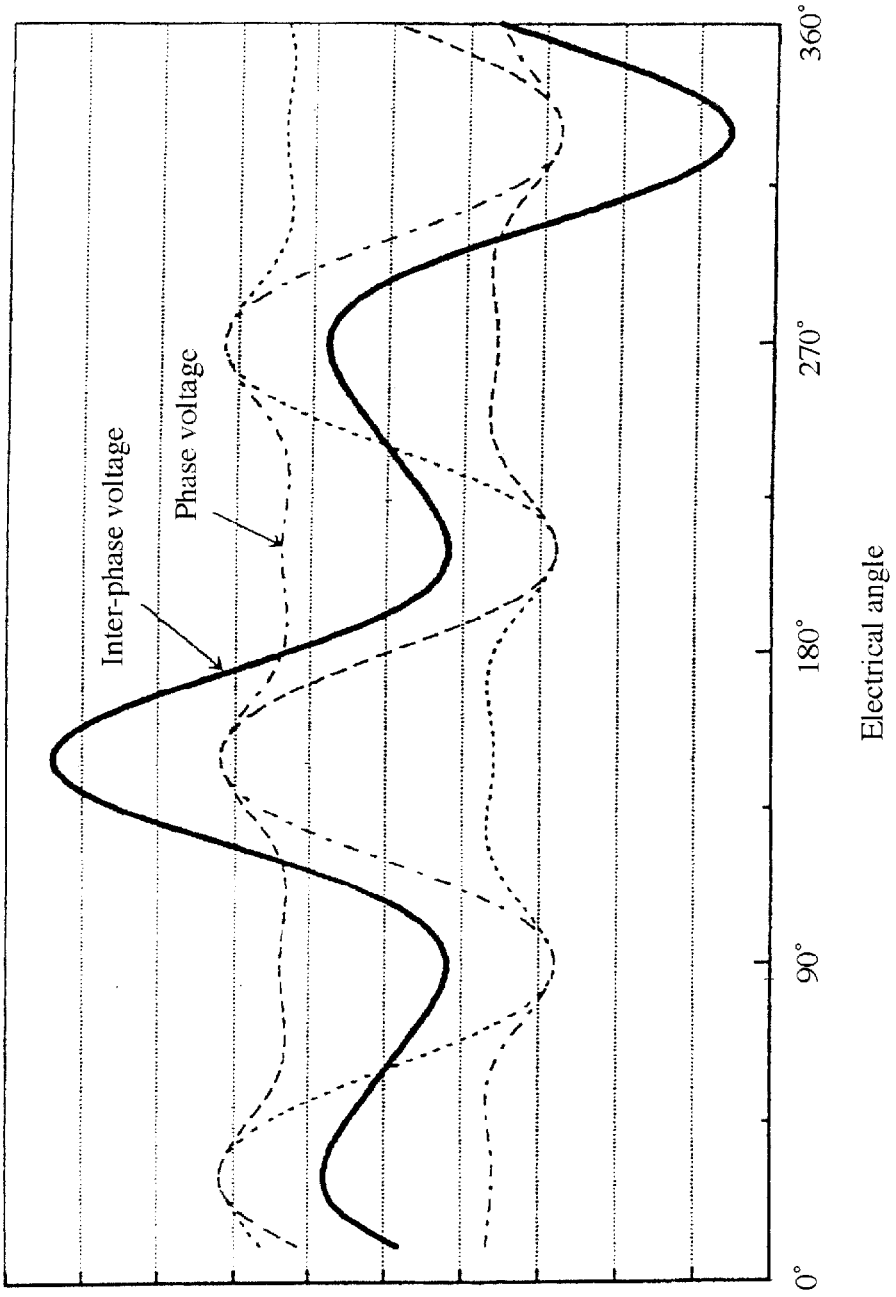
FIG. 13 is a graphical view showing the inter-phase voltage waveform of a conventional arrangement.
Figure 14:
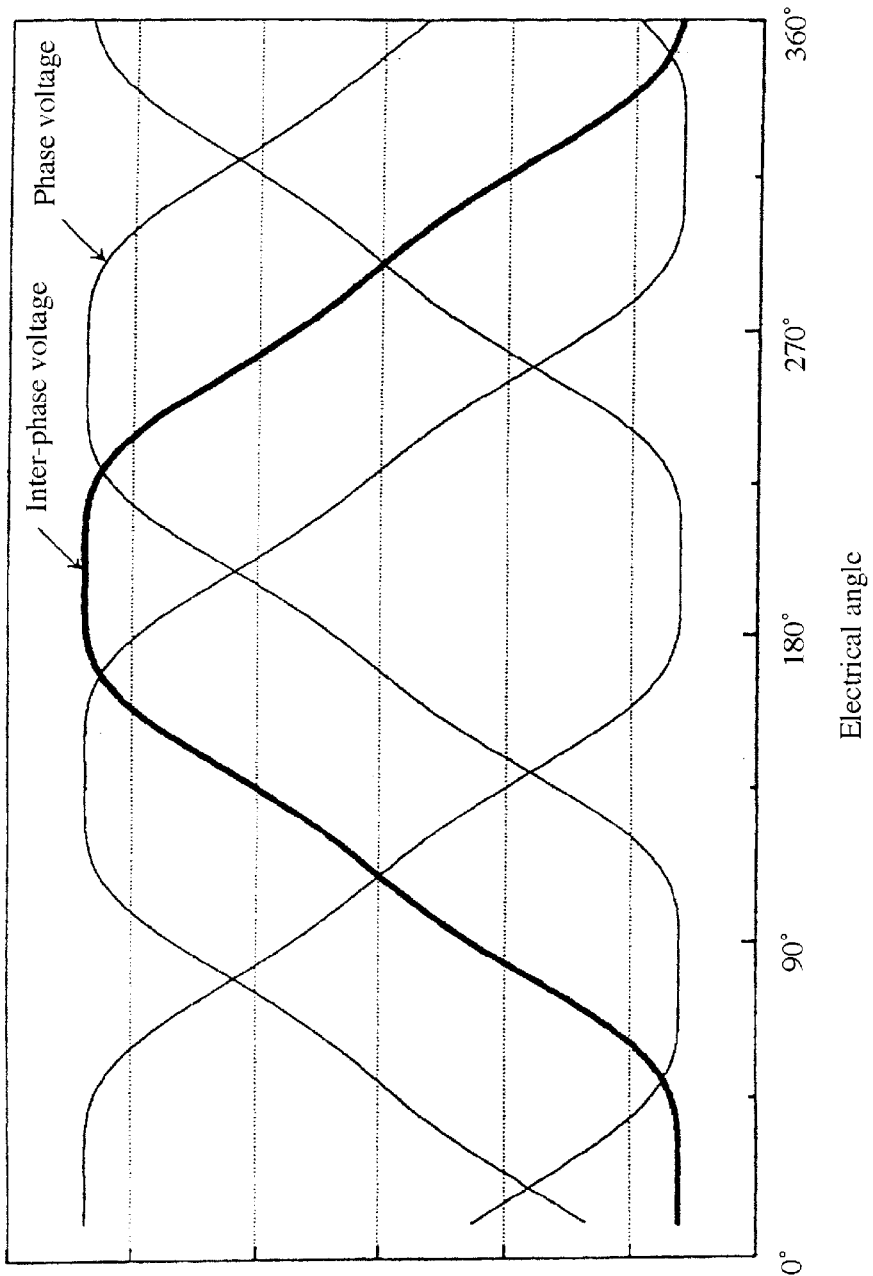
FIG. 14 is a graphical view showing the inter-phase voltage waveform of a generator constructed in accordance with the invention.

FIGS. 13 and 14 show the inter-phase voltage waveforms obtained by computer simulation analysis. FIG. 13 shows the result obtained from the phase voltage shown in FIG. 11. FIG. 14 shows the result obtained from the phase voltage shown in FIG. 12.

Figure 5:
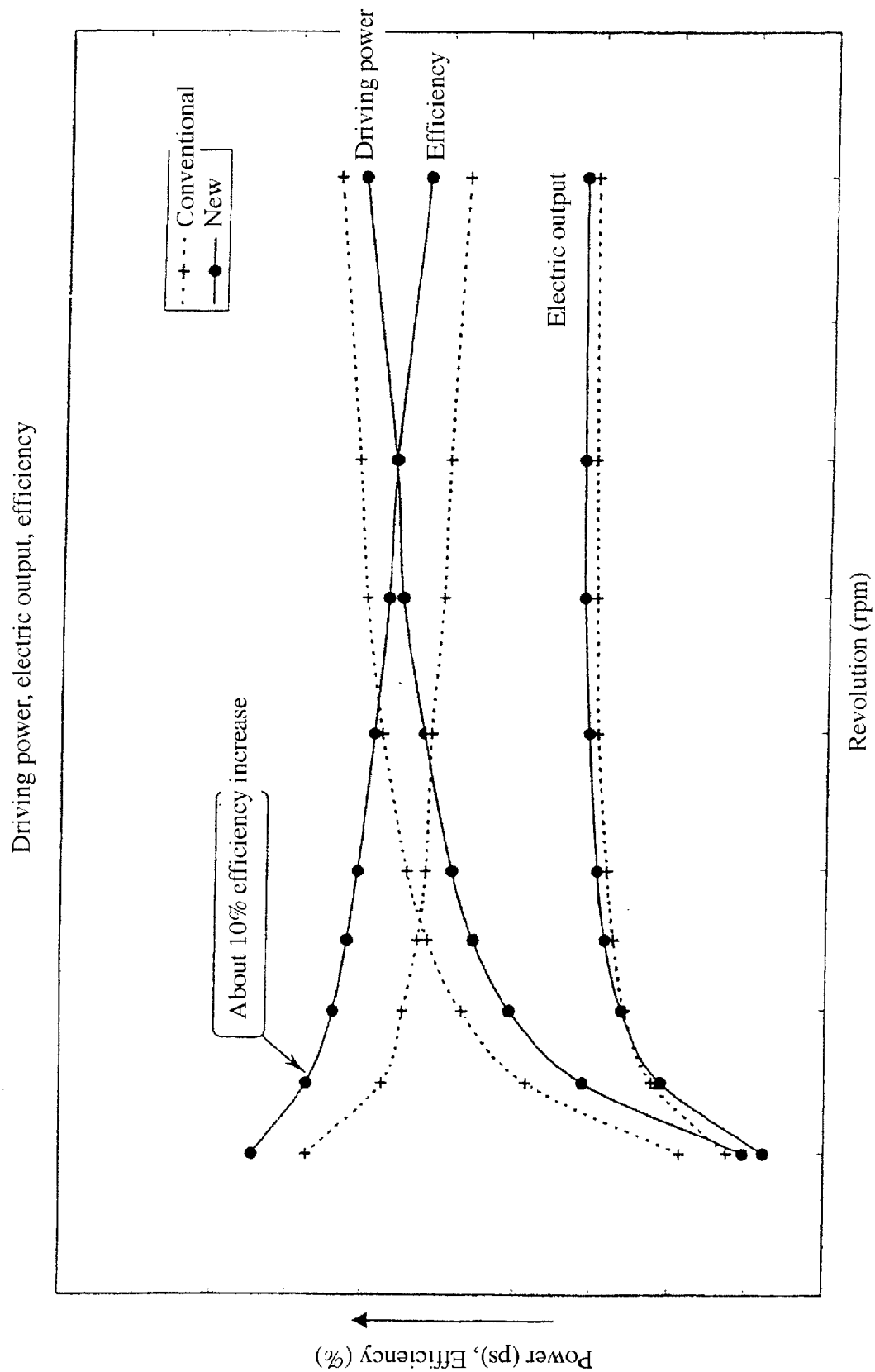
FIG. 5 is a graphical view comparing efficiency, driving power and electrical output verses speed in a prior art machine, in broken lines, and for a machine practicing the invention, shows output waveform distortion.

FIG. 5 shows comparison between an embodiment of the invention (with 16 poles and 18 teeth, indicated as New in the figure) and a conventional arrangement (with 12 poles and 18 teeth, indicated as Conventional in the figure) for driving power, electric output, and efficiency. As seen from the figure, the driving power decreases and the efficiency improves about 10% over the entire range of revolution.

Figure 6:
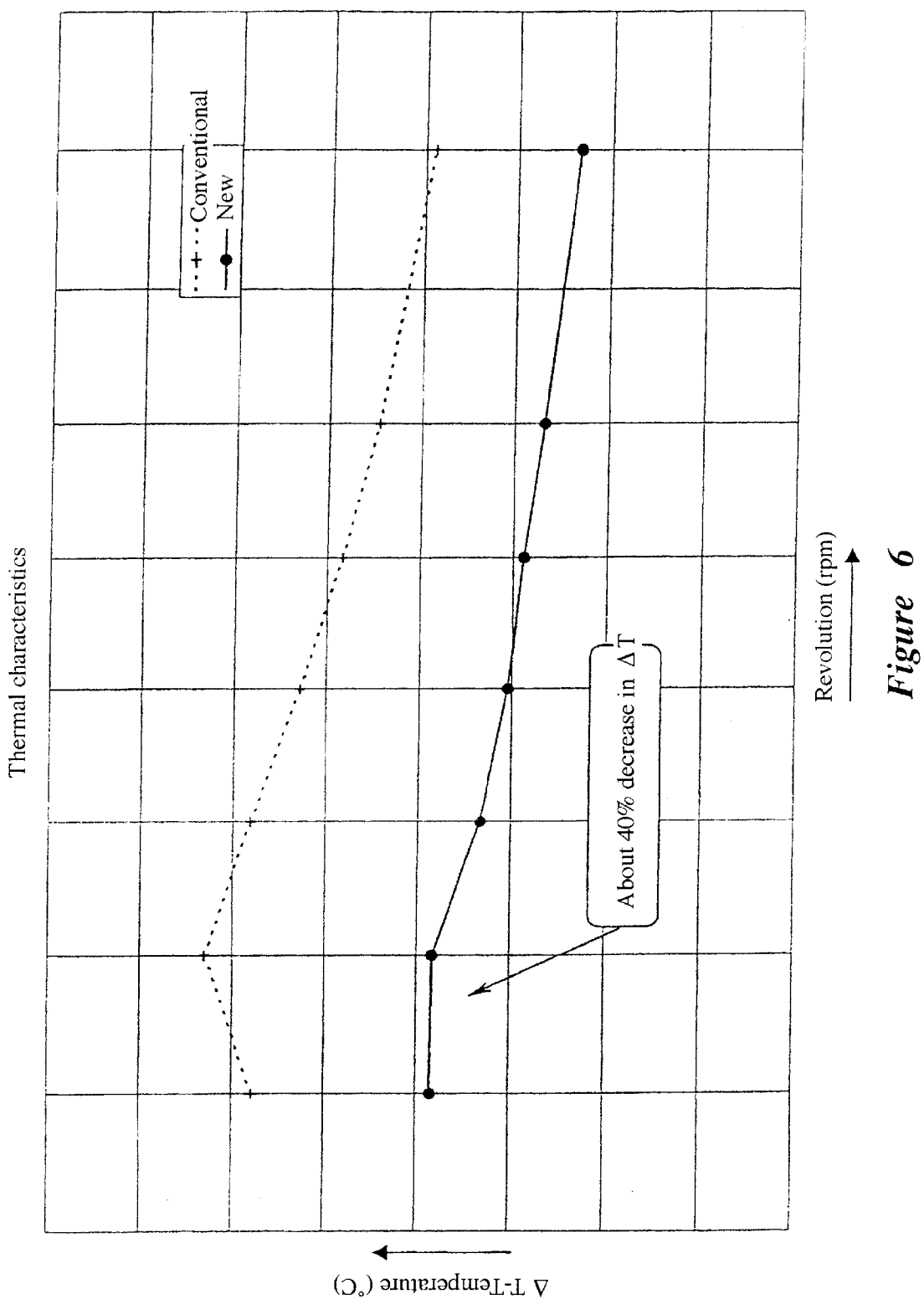
FIG. 6 is a graphical view showing thermal characteristics in a prior art machine, in broken lines, and for a machine practicing the invention, in solid lines. phase voltage waveform.

FIG. 6 shows thermal characteristics. In the figure, differential temperature $\Delta T$ (° C.) between the stator coil and the stator holder 44 for securing the stator is plotted against the revolution (rpm). As seen from the figure, this invention reduces the coil temperature, by a large margin in comparison with the conventional arrangement, about 40% over the entire revolution range. As a result, room is provided to reduce the size of the stator and rotor by making the stator coil more compact, or from the viewpoint of the generator size, it is possible to provide more power with the same size of the generator.

It should be understood that the foregoing describes only preferred embodiments of the invention and that various changes are possible without varying from the spirit and scope of the invention as set forth in the appended claims. For example, while the above described embodiments use a neodymium-ron-boron magnet for the permanent magnet 24, this invention also includes arrangement using other permanent magnets such as those using rare-earth and ferrite. Moreover, while the above embodiments are of the outer rotor type with the rotor rotating outside the stator, the invention also includes a inner rotor type in which a rotor rotates radially inside an annular stator.

What is claimed is:

1. A multi phase generator comprised of relatively rotatably first and second components, said first component having a plurality of segmented, permanent magnets affixed to thereto in circumferentially spaced array, said permanent magnets having adjacent edges and opposite polarity in a direction of relative rotation, said second member having a plurality of armature teeth having coils wound the therearound so that an electrical current will be induced in said coil windings upon relative rotation between said first and second members, same phase coils are wound on the armature teeth disposed in succession in the direction of relative rotation with winding directions reversed and corresponding to changes in the polarity of the permanent magnets opposing respective teeth, said permanent magnets and said armature teeth being configured such that no more than two armature teeth are in registry with a single permanent magnetic during the relative rotation, the number of magnetic poles 2n and the number of teeth 3m are set so that $(2\pi/2n-2\pi/3m)\times(m-1)$ does not exceed $(\pi/2n)$.

2. A generator as set forth in claim 1 wherein the voltages induced at the armature teeth is the same phase voltage and of the same phase around the circumference of the machine.

3. A generator as set forth in claim 1 wherein the number of magnetic poles is equal to 2n and the number of armature teeth is equal to 3m, where n and m are positive integers, and 2n divided by m is not an integer.

4. A generator as set forth in claim 3 wherein the voltages induced at the armature teeth is the same phase voltage and of the same phase around the circumference of the machine.

5. A generator as set forth in claim 1 wherein the permanent magnets comprise neodymium-iron-boron magnets.

6. A generator as set forth in claim 1 wherein the generator is of the three phase type.

7. A generator as set forth in claim 6 wherein the number of magnetic polls is equal to 2n and the number of armature teeth is equal to 3m, where n and m are positive integers, and 2n divided by m is not an integer.

8. A generator as set forth in claim 7 wherein the number of teeth 3m is an odd number.

9. A generator as set forth in claim 6 wherein the number of armature teeth is an even number, and that the coils in the same phase are wound in succession on m/2 teeth arranged in succession in the direction of relative rotation and on m/2 teeth located symmetrically with their winding directions reversed to correspond to changes in polarity of the permanent magnets opposing respective teeth.

10. A multi phase generator comprised of relatively rotatably first and second components, said first component having a plurality of segmented, permanent magnets affixed thereto in circumferentially spaced array, said permanent magnets having adjacent edges and opposite polarity in a direction of relative rotation, said second member having a plurality of armature teeth around which coils are wound so that an electrical current will be induced in said coil windings upon relative rotation between said first and second members, the same phase coils are wound on the armature teeth disposed in succession in the direction of relative rotation with their winding directions reversed and corresponding to changes in the polarity of the permanent magnets opposing respective teeth, said permanent magnets and said armature teeth being configured such that no more than two armature teeth are in registry with a single permanent magnet during the relative rotation, the number of armature teeth is a multiple of one of 9 or 3×3×s, and that the coils in the same phase are wound in succession on m/s teeth equally divided by s in succession in the direction of relative rotation and located symmetrically with their winding directions reversed to correspond to changes in the polarity of the permanent magnets opposing respective teeth.

* * * * *